UNITED STATES PATENT OFFICE.

THEODOR KURT KLIMMER, OF BERNBURG, GERMANY.

PROCESS OF MAKING ALKALINE SALTS OF METALLIC ACIDS.

SPECIFICATION forming part of Letters Patent No. 558,818, dated April 21, 1896.

Application filed November 21, 1894. Serial No. 529,516. (No specimens.)

*To all whom it may concern:*

Be it known that I, THEODOR KURT KLIMMER, a subject of the King of Saxony, and a resident of Bernburg, in the Duchy of Anhalt, German Empire, have invented a new and useful Process of Preparing Alkaline Salts with Metallic Acids; and I do hereby declare that the following is a full, clear, and exact description of the invention, which will enable others skilled in the art to which it appertains to make and use the same.

The present invention relates to the process of preparing alkaline salts with metallic acids—that is to say, alkaline salts of which the acid components consist of oxyacids formed by certain heavy metals, such as chromium, manganese, or tin—and which essentially consists in calcining ores containing the respective heavy metal in the form of an oxid, together with an alkali in the presence of air, lixiviating the resulting mass and separating the salt formed from the lye.

The direct use of caustic alkali—for instance, caustic soda—being not expedient, as well for the cost as for technical reasons, and the use of sodium carbonate being not capable of resulting in a satisfactory decomposition, owing to the too weak basic nature of the same, the process is at present generally carried out by the aid of the fact that sodium carbonate is readily converted into sodium oxid or "caustified" by subjecting it to the action of heat in the presence of lime—that is to say, the chromic or other ore is calcined together with sodium carbonate, to which is added a large excess of lime, whereby it is caustified. This mode of proceeding has the disadvantage of causing large masses of a residue, which is not any more serviceable but becomes very troublesome by its accumulation. Moreover there are losses of ore and chromate, as, on the one hand, part of the ore remains in the undecomposed state and is thrown away with the residue, and, on the other hand, it is impossible to so perfectly lixiviate the mass as to extract therefrom all the chromate formed. Besides the lixiviating process itself causes the production of an insoluble calcium chromate.

I have discovered that the addition to the mixture of chromic ore and alkaline carbonate of ferric oxid causes a very efficacious caustification of the alkaline carbonate, so that the ore is energetically decomposed and thereby the formation of the chromate promoted. The resulting mass consequently consists of the chromate formed, the ferric oxid originally added, the ferric oxid resulting from iron contained in the ore, alumina, silicic acid, and other mineral matter originally present in the ore. The lixiviation of this mass therefore leaves behind a residue, which mainly consists of ferric oxid or ferric hydrate, and thus forms a valuable product for metallurgical and other industrial purposes.

In order to obtain the residue of the lixiviating process as free as possible from alumina, silicic acid, &c., I use a small excess of soda or potash in the calcining process, whereby the said impurities are converted into soluble alkaline compounds, which are dissolved simultaneously with the chromate in the lixiviating process and can easily be separated from the chromate solution in the well-known manner. Thus the residue only consists of ferric oxid and the rest of the undecomposed ore and can directly be reutilized in a subsequent operation in place of a fresh quantity of ferric oxid. The excess of ferric oxid which results from thus reutilizing the residues in subsequent operations is used for preparing English red, chromic steel, purifying mass for lighting gas, &c. In this manner not only the troublesome disadvantages connected with the lime process are done away with, but the iron contained in the chromic ore is obtained as a valuable by-product.

The best results will be obtained by carrying out the improved process in the following way: Two hundred and thirty kilograms of chromic ore containing fifty per cent. of chromic oxid are well mixed, in a finely-ground state, with one hundred and seventy kilograms of sodium carbonate and two hundred kilograms of finely-ground ferric oxid, so as to form a homogeneous mixture. The latter is spread out in a reverberatory furnace, preferably a revolving furnace, so that it forms a uniform layer of about ten to twelve centimeters thickness and roasted at a temperature of about 1,000° centigrade for about eight to ten hours, the mass being frequently stirred. After the roasting is finished the mass is removed from the furnace and allowed to cool, when it is lixiviated in the usual manner. The lye obtained is treated in the well-known manner and the residue is dried and ground for reuse in a subsequent operation.

The improvement described with reference to the production of alkaline chromates may also be made use of for producing alkaline manganates or stannates by replacing the chromic ore by ores containing manganese combined with oxygen—as, for instance, pyrolusite, hausmannite, psilomelane, and others, or tin combined with oxygen—as, for instance, cassiterite or tin-stone.

What I claim is—

1. The improved process of preparing alkaline salts with the oxyacids of heavy metals from ores containing the respective heavy metal combined with oxygen, which consists in mixing the ore with ferric oxid and alkaline carbonate, calcining the mixture in the presence of air, and lixiviating the resulting mass, substantially as and for the purpose stated.

2. The improved process of preparing alkaline salts with oxyacids of heavy metals from ores containing the respective heavy metals combined with oxygen, which consists in mixing the ore with ferric oxid and an excess of alkaline carbonate, heating the mixture in the presence of air, lixiviating the resulting mass, and reutilizing the residue in a subsequent operation, substantially as and for the purpose stated.

In testimony whereof I have hereunto set my hand in the presence of two subscribing witnesses.

THEODOR KURT KLIMMER.

Witnesses:
   JULIUS MUTH,
   CARL HOLZAPFEL.